United States Patent [19]

Sadan

[11] 4,088,451
[45] * May 9, 1978

[54] CONCENTRATION OF UNDERGROUND BRINES IN SITU BY SOLAR EVAPORATION

[76] Inventor: Abraham Sadan, P.O. Box 8471, Salt Lake City, Utah 84108

[*] Notice: The portion of the term of this patent subsequent to Jun. 29, 1993, has been disclaimed.

[21] Appl. No.: 663,197

[22] Filed: Mar. 2, 1976

Related U.S. Application Data

[63] Continuation-in-part of Ser. No. 551,395, Feb. 20, 1975, Pat. No. 3,966,541.

[51] Int. Cl. .............................. B01d 9/02; C01d 1/30; C01d 3/06
[52] U.S. Cl. ..................... 23/295 S; 23/298; 23/300; 23/302 T; 23/303; 159/15; 423/279; 423/186; 61/.5
[58] Field of Search .............. 23/295 S, 272 AH, 298, 23/302 J, 302 R, 296, 303, 297; 159/47 R, 15; 423/279, 186; 61/.5; 299/4, 5

[56] References Cited

U.S. PATENT DOCUMENTS

| Re. 24,318 | 5/1957 | Pattinson | 61/.5 |
|---|---|---|---|
| 1,353,283 | 9/1920 | Silsbee | 23/272 AH |
| 1,892,760 | 1/1933 | Burnham | 23/295 S |
| 2,200,665 | 5/1940 | Bolton | 23/272 AH |
| 3,262,741 | 7/1966 | Edmonds | 23/272 AH |
| 3,348,883 | 10/1967 | Jacoby | 23/272 AH |
| 3,910,773 | 10/1975 | Garrett | 23/302 T |

FOREIGN PATENT DOCUMENTS

| 2,053,982 | 4/1971 | France | 23/303 |

OTHER PUBLICATIONS

Hightower, The Trona Process, Aug. 1951, Chem. Eng., pp. 104-106.

*Primary Examiner*—Stephen J. Emery
*Attorney, Agent, or Firm*—Hopgood, Calimafde, Kalil, Blaustein and Lieberman

[57] ABSTRACT

A process is provided for the recovery of chemicals, such as chlorides, sulfates, carbonates and borates of such alkali metals as sodium and potassium, among others, from underground brines associated with an ore body containing said chemicals, wherein the underground brine is pumped to the surface and confined over said ore body where it is concentrated by solar evaporation and the concentrated brine returned to an underground basin adjacent said ore body and stored for later removal by pumping for the subsequent recovery of chemicals therefrom. Thus, solar evaporation is used to produce the desired concentration of brine to optimize the subsequent recovery of chemicals therefrom, thereby resulting in substantial savings in overall energy costs.

3 Claims, 9 Drawing Figures

CONCENTRATION OF UNDERGROUND BRINES IN SITU BY SOLAR EVAPORATION

This application is a continuation-in-part of Ser. No. 551,395, filed Feb. 20, 1975.

This invention relates to a process for the recovery of chemicals from underground brine in the production of such chemicals as sodium carbonate, salt cake, potassium salts, borax and other chemicals.

STATE OF THE ART

Generally speaking, natural brines are found in various parts of the United States and are the result of thousands of years of evaporation, wherein concentrated brines have accumulated in closed basins or lakes. These brines contain many soluble salts of alkali metals, such as chlorides, sulfates, borates or carbonates of sodium and potassium.

A well known example is the complex Searles Lake brine in the Mojave Desert which contains chlorides, borates, carbonates, bicarbonates and sulfates of sodium and potassium which are used for the production of borax, salt cake, potassium chloride, soda ash (sodium carbonate) and potassium salts.

In some cases, the process of natural evaporation has resulted in the formation of evaporite minerals (i.e. solids), such as carnallite ($MgCl_2.KCl.6H_2O$) and langbeinite ($2MgSO_4.K_2SO_4$) in Carlsbad, New Mexico; sylvite (KCl) in Moab, Utah, and Trona ($Na_2CO_3.NaHCO_3.2H_2O$) in Green River, Wyoming.

In many instances, brine has been trapped below the surface (underground brine) before nature has had a chance to complete the concentration. The high cost of underground mining and the scarcity of evaporite minerals has naturally attracted the attention of industry to closed basins and lake brines as a source of evaporite minerals, the brines being concentrated by the application of heat for evaporation. However, the recent increase in fuel costs has posed serious economic problems.

Most of the closed basins or lakes contain complex brines which are capable of providing more than one evaporite mineral product and, therefore, successful commercial utilization of these brines will depend on a multi-product operation, such as that which prevails at the Dead Sea Works in Israel where an evaporation ponds system is used for the production of salt, table salt, potash, bromine, bromides, dead burnt magnesia (periclase) and hydrochloric acid, the acid finding use in the production of phosphoric acid in a solvent extraction process.

Large scale production of evaporite minerals by solar evaporation requires considerable skill in the engineering and design of the evaporation system and the refinery as well and, moreover, thought must be given to the operation of the whole complex during a full year's cycle. Generally, miscalculations in operations can be corrected in most cases only in the following year. Recently, some companies have been relying on computers programmed to guide their operations.

With regard to the Searles Lake operations at Trona, California, the recovery of products from the brines is accomplished by the process of evaporation followed by fractional crystallization, this process being known as the TRONA PROCESS.

The brine is pumped from wells sunk to the bottom of the lake's two salt structures. The Searles Lake deposit has an upper deposit or strata which supplies brine for the main process and a lower deposit for processing in the soda-ash-borax carbonation plant. The two brines differ from each other in that the lower brine contains less potash but is richer in soda ash and borax from the upper strata brine which make it more suitable for the carbonation process. Several million gallons of brine are pumped daily to the plant location a few miles away. The brine from the upper strata is first circulated as a coolant through coolers in the potash plant to absorb heat therefrom, the brine being thereafter combined with end liquors from a previous operation cycle, the brine then going to triple-effect evaporators where it is evaporated under vacuum.

During evaporation, salts crystallize from the boiling liquor and are collected and filtered. These salts comprise NaCl, $Na_2CO_3$ and burkeite ($2Na_2SO_4.Na_2CO_3$). The salts are subjected to further treatment to recover soda ash and salt cake.

The hot liquor remaining after separation of the sodium salts is rich in potash and borax. The potash is crystallized out by rapid cooling under vacuum and separated from solution by centrifuging and drying in rotary driers, the product being shipped without further treatment. The concentrated solution remaining is then treated to crystallize out sodium tetraborate pentahydrate which is separated by filtration and which is later dried and part of it used to produce anhydrous sodium borate, also called pyrobor. The burkeite remaining is converted into two intermediate products: Glauber's salt ($Na_2SO_4.10H_2O$) and sal soda. The sal soda is then concentrated in evaporators and recrystallized as sodium carbonate monohydrate ($Na_2CO_3.H_2O$). After filtering, the product is kiln calcined to soda ash ($Na_2CO_3$).

The brine from the lower strata of the Searles Lake deposit is employed as feed to the carbonation tower where the sodium carbonate is converted to sodium bicarbonate which is thickened, filtered, dried and calcined to soda ash. The liquor remaining from the carbonation treatment is cooled in an induced draft cooling tower to effect the precipitation of crude borax which is later refined.

The Problem Confronting the Art

The initial part of the TRONA PROCESS requires a large amount of heat energy in order to achieve the desired concentration of the brine for the subsequent steps of either the carbonation or the evaporation processes. Solar evaporation would be particularly useful from an economic viewpoint, especially since the solar evaporation rates in the Searles valley are one of the highest in the world, the evaporation rate of Searles Lake brine reaching upwards to 100 inches of water per year. For the more concentrated brine, the rate of evaporation may range up to one-half of the foregoing amount.

Thus, the use of solar evaporation in the Searles Lake region would be particularly attractive. However, a drawback is that solar evaporation is seasonal in nature and the most efficient evaporation season has a duration of about one-half year. The storing of the resulting concentrated brine for use in the winter months is a problem until new brine is available from the next evaporation regime as the brine must not be cooled as this will cause premature crystallization of the valuable minerals and deplete to a significant extent the brine of said minerals content before the next step of the process is applied and, moreover, the exposed brine might be diluted with rainwater during the winter.

A proposal to overcome this problem has been to store the brine in vast insulated containers using steam tracing to maintain the right temperature. However, this is very expensive and uneconomical.

The construction of solar ponds likewise is expensive as it requires the use of impermeable soil foundation and sufficient diking (e.g. construction of embankments) to confine the brine. Moreover, the dikes may require the linking thereof with plastic sheeting to prevent leaking of the brine through the dikes. The amount of halite and burkeite crystallizing out of the brine also presents a problem of removal; whereas, leaving the salts in the ponds would require raising the height of the dikes which increases the problem of seepage.

As will be clearly apparent, the use of conventional solar evaporation methods presents many problems. However, I have now discovered a way of using solar evaporation as a means of decreasing fuel costs and of economically carrying out a process similar to the TRONA PROCESS and of carrying out the carbonation process at a significantly lower cost.

Objects of the Invention

It is thus the object of the invention to provide an improved process for recovering chemicals from underground brines using solar evaporation as a first step in carrying out the aforementioned process.

Another object is to provide a process for the recovery of chemicals from underground brine wherein said brine is pumped to the surface and accumulated as a confined body for solar evaporation, the brine concentrated by solar evaporation and the resulting concentrated brine returned back to the natural underground basin from which it was removed for storage until it is time to use the concentrated brine in the completion of the recovery processes.

A further object is to provide a process for removing undesirable salt, such as sodium chloride, during the process of concentration by evaporation.

These and other objects will more clearly appear from the following disclosure and the appended drawings, wherein.

STATEMENT OF THE INVENTION

Figure 1:
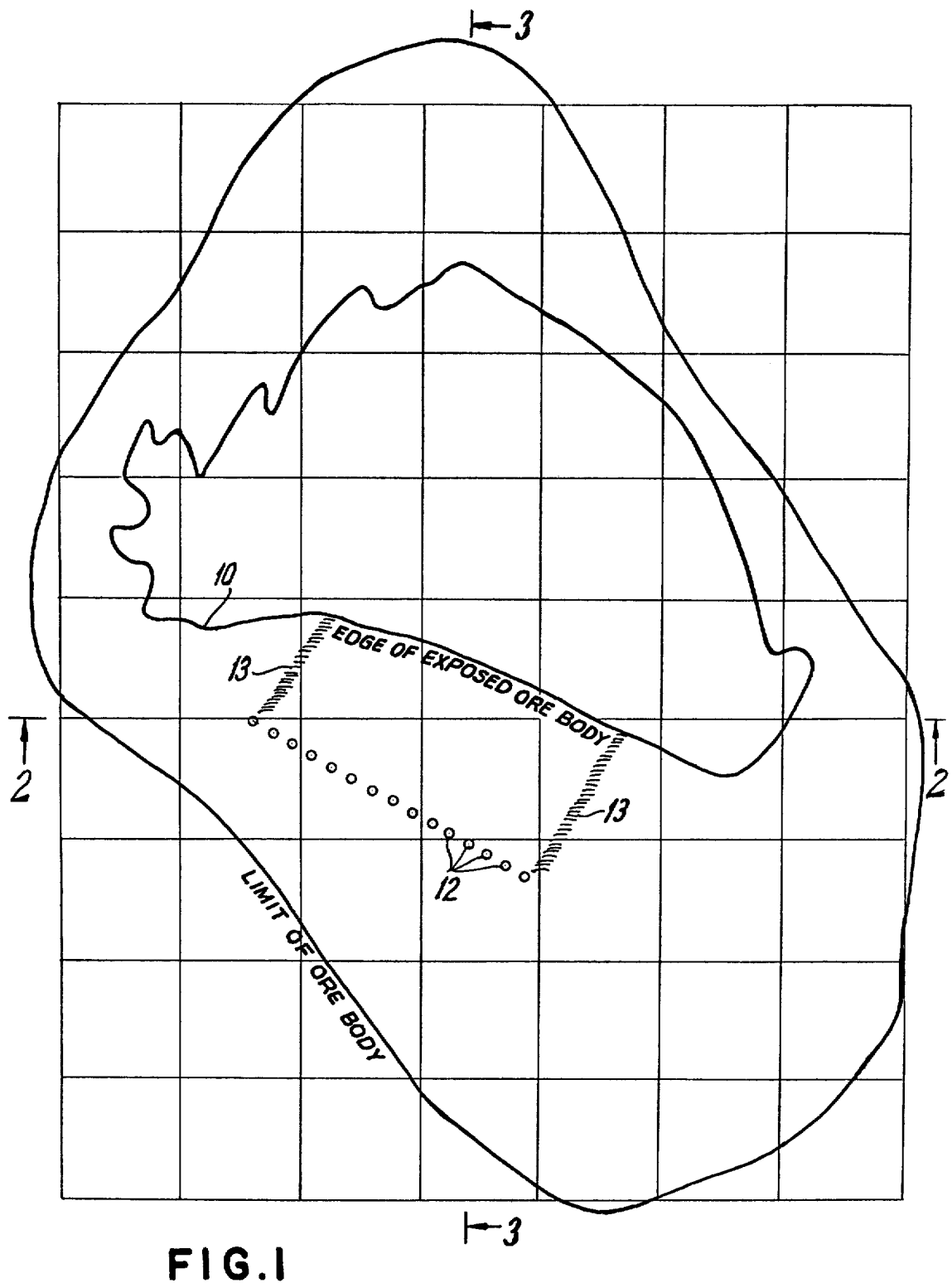
FIG. 1 is a plan view of a typical ore body (e.g. Searles Lake area) showing an exposed ore body and location of wells relative to said ore body for pumping underground brine from an underground basin to the surface.

Broadly stated, the invention resides in a process for recovering salts from underground brine associated with a salt-containing body comprising the steps of pumping brine from an underground basin to the surface of said salt-containing body to accumulate a confined body of brine thereof, subjecting said confined brine to concentration by solar evaporation, and then returning the resulting concentrated brine to said underground basin until the desired amount of concentrated brine has been produced for the subsequent recovery of chemicals therefrom. The amount of concentration by solar evaporation is that amount which results in the precipitation of crystallization of substantial amounts of salt.

By "ore body" is meant any body which is salt-containing, including sands containing brine or other valuable deposits.

The invention is particularly directed to the recovery of salts from underground brine associated with a porous ore body comprising establishing at least one well in communication with the brine of said ore body and then pumping the brine via said well to the surface of the ore body to accumulate a confined body of the brine over said ore body for exposure to solar heat, the surface and strata of said ore body being sufficiently permeable to allow brine concentrated by solar evaporation to percolate downwardly into an underground basin associated with said ore body, the cycle of withdrawing brine and returning brine of increased concentration to the underground basin being continued until sufficient concentrated brine is obtained to economically optimize the recovery of chemicals therefrom.

This process is unique in that large fuel savings are possible with minimal investment costs since natural underground storage means are employed for storing the concentrated brine. It is possible in carrying out the broad aspects of the invention to reach a steady state as between the brine removed and the concentrated brine fed back to the ore body, whereby as brine is being concentrated, concentrated brine may be pumped from the underground basins for carrying out the subsequent steps of the process for recovering chemicals from the brine.

The exposed space on top of the salt ore body is used for carrying out the evaporation much as a solar pond is used, except for minimum use of confining dikes for directing the brine to the area over the salt body. This area is preferably permeable to brines of high density and is advantageous in that seepage through the salt bed is beneficially employed in carrying out the invention, whereby the concentrated brine is stored underground from where it was obtained. Thus, the concentrated brine is naturally insulated against cooling. While it is appreciated that the original brine in the ore body cannot be completely concentrated in a short time, it will be understood that the high specific gravity of the concentrated brine enables the brine to reach the bottom of the ore body from which the concentrated brine can be drawn. In the alternative, the concentrated brine can be directed to another area removed from the immediate vicinity of the ore body from where it can be drawn at an earlier stage of the process.

As illustrative of one embodiment of the invention in conjunction with FIGS. 1 to 6, the following example is given.

Figure 2:
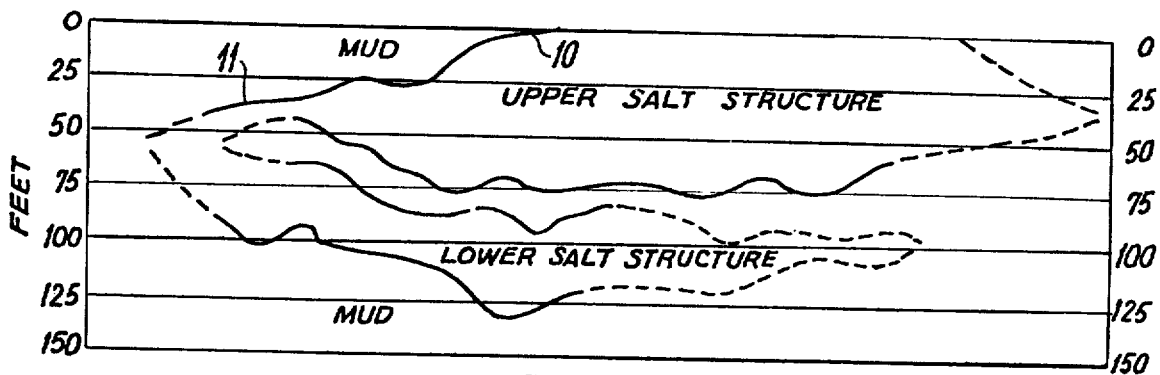
FIG. 2 is a section in elevation taken along line 2—2 of FIG. 1 showing the relative depth and boundary limits of said ore body and the mud strata containing said brine.
Figure 3:
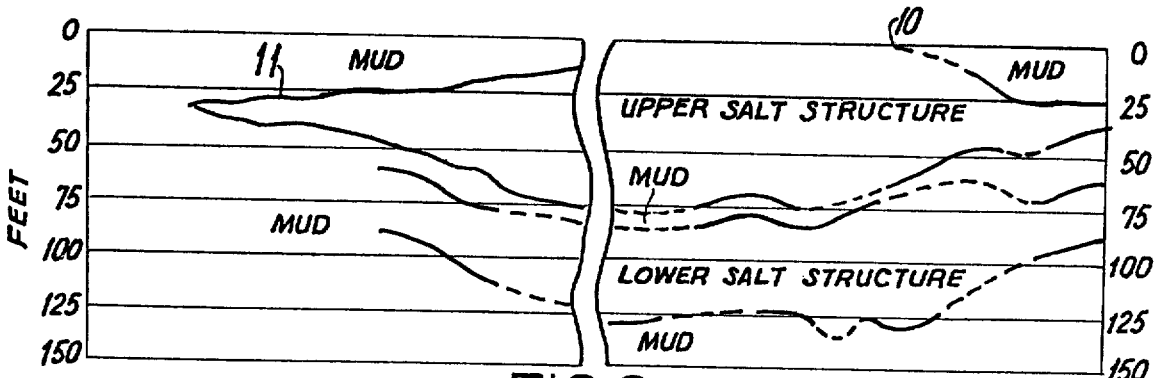
FIG. 3 is a section in elevation similar to FIG. 2 taken along line 3—3 substantially perpendicular to line 2—2 showing the depth and boundary limits of the ore body.

Referring first to FIG. 1, a plan view of an ore body is shown comprising an area 10 of an exposed portion of the ore body and area 11 showing the outer limits of the ore body below ground. As will be noted, the total area is divided into squares one mile on edge which illustrate the size of the Searles Lake ore region. FIGS. 2 and 3 which are sections in elevation taken along lines 2—2 and lines 3—3, respectively, show that the ore body is divided into an upper salt structure and a lower salt structure with brine mud strata outside and between the salt structures. The width of the ore area as depicted in FIG. 2 is about 7 miles, while the length as depicted by FIG. 3 and also shown by the plan view, is about 10 miles. The ore body extends to over 125 feet below ground (note FIGS. 2 and 3).

In carrying out solar evaporation in situ in accordance with the invention, about 15,000,000 gallons per day of Searles Lake brine may be pumped to the surface at the rate of about 15,000 gallons per minute by drilling 15 wells as shown in FIG. 1 at a distance of about 1 mile from the edge of the exposed ore body. In one embodiment, the wells 12 are arranged in a line substantially parallel to the edge of the exposed ore body with embankments 13 extending from the extreme ends of aligned wells transversely to the edge of the exposed ore body or salt bed in order to direct the flow of brine to the surface of the salt bed for solar evaporation. Each well pumps 1,000 gallons per minute. By placing the wells about one mile from the edge of the exposed salt bed, movement of brine out of the ore body within the mud is avoided.

After the exposed salt bed is flooded with underground brine, the pound of brine is exposed to solar evaporation and thereby concentrated by evaporation as evidenced by the precipitation of salt as the desired concentration is obtained. The exposed salt bed is porous and allows the concentrated or preferably substantially saturated brine to seep into it and settle by gravity into the salt bed. Seepage into the mud will be minimal since the brine will be directed as shown to exposed salt bed in the middle of the lake. An area of about 2000 acres is preferred for best results. If the ground is too permeable, the surface can be covered with mud to provide the desired permeability. If the ground is not permeable enough, the solar-concentrated brine can be pumped to the underground basin using pipe means extending to the basin.

Embankments 13 may be constructed by using an earthpushing bulldozer. The wells can be moved from one location to another. The Searles Lake area covers approximately 34 square miles, with the exposed salt bed making up about 12 square miles. The upper salt body is about 70 to 90 feet thick and the lower ore body about 20 to 40 feet thick, the two being divided by an impervious mud layer of about 13 feet thick. Both structures are porous, the brine in the upper structure being rich in potash, the brine in the lower structure being rich in carbonate and borate.

A typical analysis of Searles Lake brine is given as follows:

| Constituents Location | Searles Lake Brine, % by Weight | | | | | | |
|---|---|---|---|---|---|---|---|
| | Na | K | $CO_3$ | $SO_4$ | $B_4O_7$ | Cl | Total |

| Constituents | Searles Lake Brine, % by Weight | | | | | | |
|---|---|---|---|---|---|---|---|
| | Na | K | $CO_3$ | $SO_4$ | $B_4O_7$ | Cl | Total |
| North Top | 11.34 | 1.13 | 2.29 | 4.98 | 0.90 | 11.72 | 32.36 |
| North Bottom | 10.72 | 1.70 | 2.70 | 4.66 | 1.07 | 10.95 | 31.80 |
| South | 11.31 | 1.06 | 2.55 | 4.07 | 0.75 | 12.04 | 31.78 |
| East | 10.03 | 1.31 | 2.49 | 2.81 | 1.06 | 11.16 | 28.86 |
| West | 10.31 | 1.88 | 2.28 | 4.97 | 0.89 | 10.83 | 31.16 |
| Middle Upper and Middle Lower Brine | 10.23 | 2.46 | 2.66 | 4.70 | 1.15 | 10.86 | 32.06 |

The total analysis based on the foregoing constituents ranges from between about 28% to about 33% by weight or from about 280,000 to 330,000 parts per million of salts.

During solar evaporation of Searles Lake brine in accordance with the invention, certain salts precipitate from solution as water is evaporated to form a more concentrated brine solution. The desired concentration of the brine may be determined by specific gravity readings.

A typical Searles Lake brine contains the following constituents in percent by weight: 11.2% Na, 1.2% K, 2.9% $CO_3$, 1.1% $B_4O_7$, 4.3% $SO_4$ and 11.1% Cl or a total of 31.8%, the specific gravity being about 1.28.

Following evaporation, a more concentrated brine is obtained containing by weight 11.7% Na, 3.4% K, 5.7% $CO_3$, 3.1% $B_4O_7$, 2.9% $SO_4$ and 10.7% Cl or a total of 37.5%, the specific gravity being about 1.36. During evaporation, the salts that precipitate are mainly halite (NaCl) and burkeite ($2NaSO_4 \cdot Na_2CO_3$). As will be noted, the amount of potassium or borate in solution following concentration is increased by approximately 180% to 190% over the original analysis (for potassium $(3.4 - 1.2)/1.2 \times 100 = 183\%$ increase and for borate $(3.1 - 1.1)/1.1 \times 100 = 190\%$ increase. Thus, the concentration of potassium and borate may increase by over 50%, preferably over 75% or 100% or more over the original analysis by solar evaporation.

Figure 4:
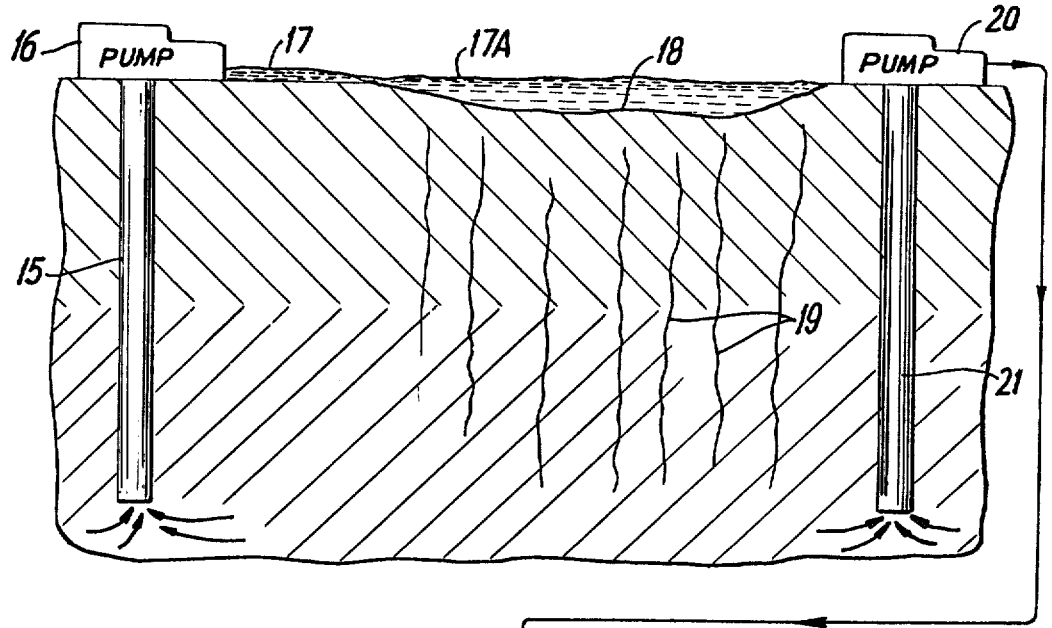
FIG. 4 is a schematic showing in elevation a first pumping station relative to the ore body for pumping out underground brine for evaporation on the exposed salt bed and a second pumping station for removing concentrated brine from the underground basin in the salt bed for further treatment.

Referring to FIG. 4, a cross section of a portion of the Searles Lake ore body is depicted schematically showing a well 15 extending into the ground for removing brine therefrom via pump 16, the brine having an average composition stated hereinabove as comprising by weight about 11.2% Na, 1.2% K, 2.9% $CO_3$, 1.1% $B_4O_7$, and 11.1% Cl, the total solids content being about 31.8% (specific gravity about 1.28). Thus, the materials of interest are carbonates, sulfates, borates and chlorides of sodium and potassium.

The brine 17 emanating from the pump is directed via suitable embankment means (not shown) to the top of permeable salt body 18 where the brine is accumulated and confined as a pond 17A for solar evaporation. As the brine is concentrated by evaporation, salts precipitate out and the more concentrated brine penetrates the porous or permeable salt body or bed and settles by gravity as shown by flow lines 19 to the underground basin below the salt bed. The underground basin is the storage volume provided by the interstices of the ore body or the surrounding earth. After sufficient concentrated brine has accumulated in the basin, it may be removed by pump 20 for further treatment as shown in FIG. 4 and in more detail in FIGS. 5 and 6. Thus, starting with the initial brine concentration given hereinabove, the following example is given.

EXAMPLE

About 7,500,000 tons of brine of the aforementioned concentration is cumulatively treated over a period of time by pumping brine from below the surface via pump 16 (FIG. 4) to maintain pond 17A which is continuously subjected to solar evaporation to increase the concentration thereof, the concentrated brine being returned to an underground basin for storage which, in this embodiment, is achieved by allowing the concentrated brine to percolate into and collect in said basin located preferably adjacent the ore body. The pond is further replenished with fresh underground brine and solar evaporation continued to accumulate the desired amount of concentrated brine. About 3,410,000 tons of water are evaporated to yield 1,590,000 tons of salts which comprise the following:

| | |
|---|---|
| 895,000 | tons NaCl |
| 422,500 | tons burkeite ($2Na_2SO_4 \cdot Na_2CO_3$) |
| 62,500 | tons $Na_2SO_4$ |
| 210,000 | tons of adhering brine |
| 1,590,000 | tons mixed salts |

The remaining brine of 2,500,000 tons has the following concentration: 11.7% Na, 3.4% K, 5.7% $CO_3$, 3.1% $B_4O_7$, 2.9% $SO_4$, 10.7% Cl (total solids of about 37.5%) and water 62.5% making up the balance.

Thus, by means of solar evaporation, 3,410,000 tons of water are evaporated over a period of time resulting in a marked saving in thermal energy. To evaporate the aforementioned amount of water would require an amount of thermal energy corresponding to over $10^{12}$ BTU's. This is a large saving indeed.

The concentrated brine of 2,500,000 tons is further conventionally treated either by evaporation or by carbonation to recover the various chemicals therefrom. The flow sheet for a conventional evaporation technique is shown in FIG. 5.

Figure 5:
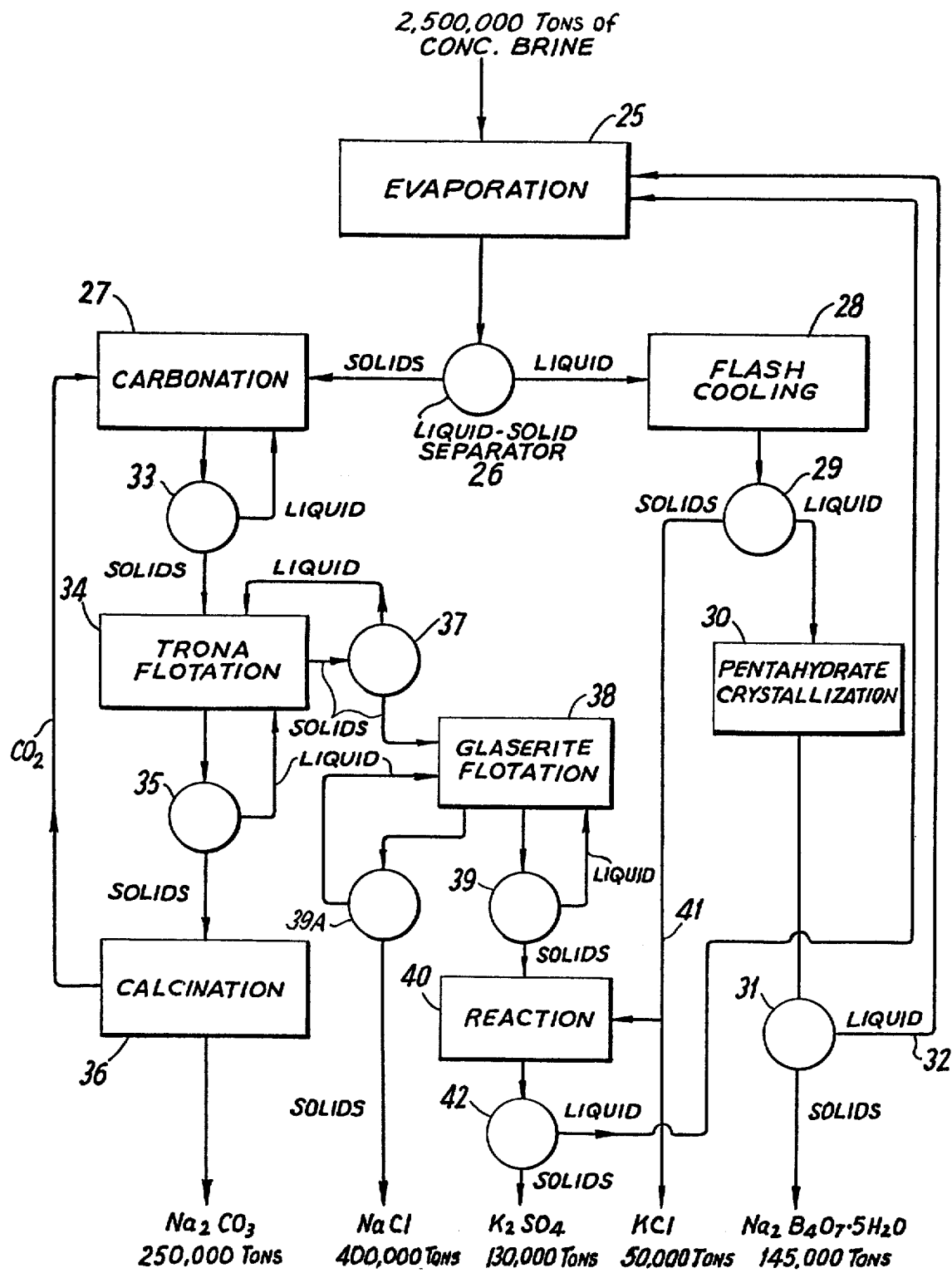
FIG. 5 is a flow sheet which may be employed in recovering salts from brine concentrated by solar evaporation in accordance with the invention.

Referring to FIG. 5, the concentrated brine is evaporated at 25 to yield a mixture of salts and hot brine, the solids and liquid being separated at 26, the solids going to carbonation at 27 and the liquid to flash cooling at 28 to precipitate potassium chloride (KCl) and a supersaturated liquid of sodium borate, KCl being separated from the supersaturated liquid, the solids comprising 50,000 tons of KCl. Following flash cooling at 28, the supersaturated liquid is sent to crystallizer 30 where sodium borate pentahydrate is crystallized ($Na_2B_4O_7 \cdot 5H_2O$), the mixture sent to separator 31 to produce a solids product of 145,000 tons of $Na_2B_4O_7 \cdot 5H_2O$, the liquid remaining being recycled via line 32 to the first evaporation step at 25.

The solids from separator 26 are subjected to carbonation at 27 to yield a hydrated double salt of sodium carbonate and sodium bicarbonate (trona) which is separated from the liquid at 33 with the solids going to trona flotation at 34 and the liquid recycled to carbonation at 27. The hydrated double salt ($Na_2CO_3 \cdot NaHCO_3 \cdot 2H_2O$) is floated at 34 and passed to separator 35 where it is separated from the liquid which is recycled to trona flotation at 34, the separated solids going to calcination at 36 to produce 250,000 tons of soda ash ($Na_2CO_3$), the $CO_2$ from calcination being recycled to carbonation (27).

The remaining salts not floated at 34 are passed to separator 37 and separated from the liquid which is recycled to trona flotation 34, the solids going to glaserite flotation at 38 to recover the double salt $NaK_3$-$(SO_4)_2$ which is separated from the liquid at 39, the solids going to reaction step 40 where it is reacted with potassium chloride (KCl) bled from line 41 coming from separator 29. Potassium sulfate is formed by reaction which is separated from the liquid at 42 to provide 130,000 tons of $K_2SO_4$ salt, the liquid being recycled to evaporation at 25.

Following glaserite flotation, 400,000 tons of NaCl are recovered via liquid-solids separation at separator 39A.

Figure 6:
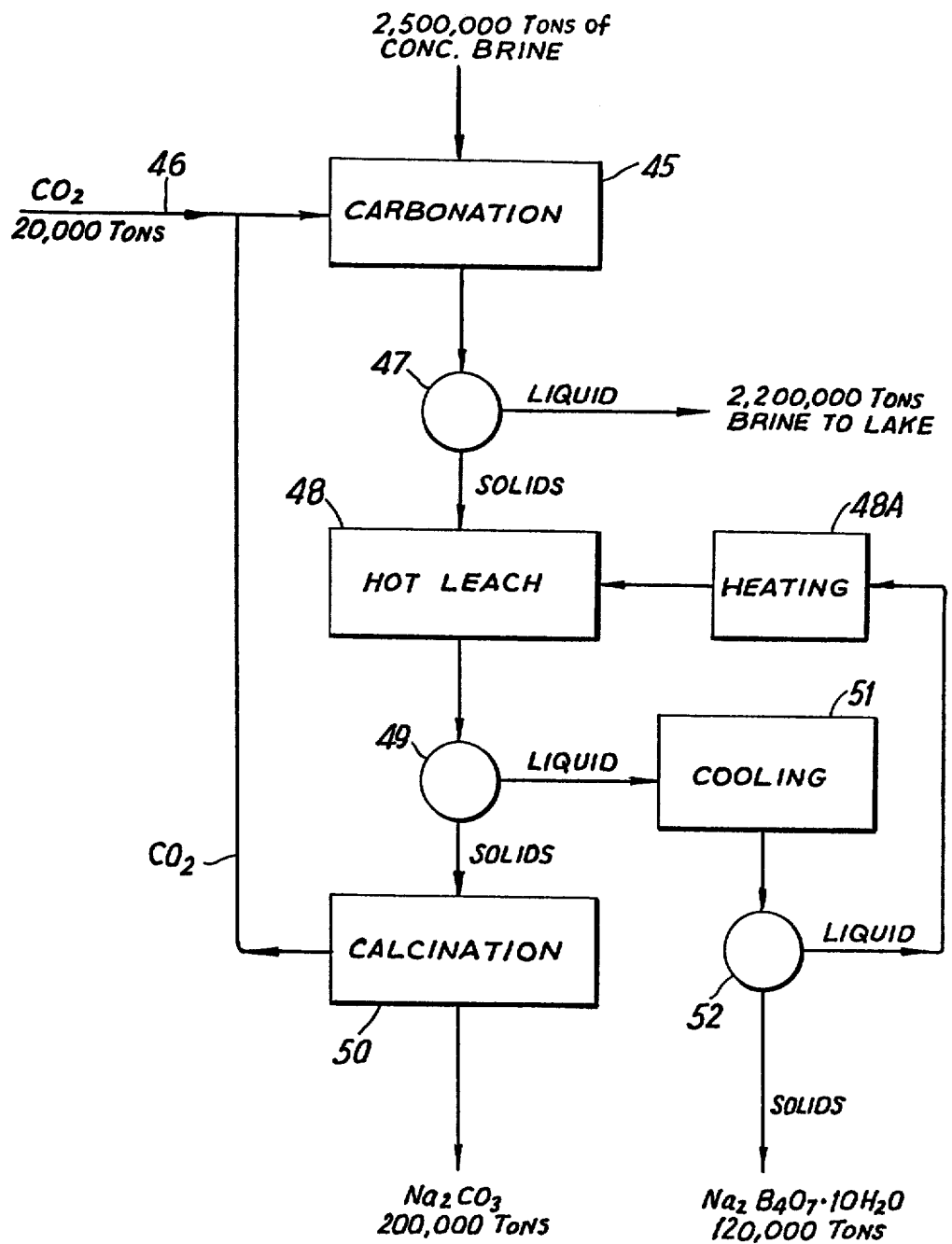
FIG. 6 is another flow sheet for recovering salts from brine following concentration of underground brine by solar evaporation.

In the alternative, the 2,500,000 tons of concentrated brine can be subjected directly to carbonation as shown by the flow sheet of FIG. 6.

Thus, the brine enters the carbonation stage at 45 where carbon dioxide contacts the brine to yield a mixture of borax and bicarbonate which mixture is separated from the brine at 47, the brine going to the lake, the solids to hot leach at 48 in which the bicarbonate as the solids is separated at 49 from the borax solution, the solids going to calcination at 50 where it is converted to 200,000 tons of $Na_2CO_3$, the $CO_2$ formed during calcination being recycled to the carbonation stage at 45.

The borax solution from separator 49 is cooled at 51 to crystallize out hydrated borax crystals, the crystals being separated at 52 to produce 120,000 tons of product, the liquid being sent to heater 48A for recycling to hot leach 48.

The foregoing methods of evaporation and/or carbonation of recovering the products are well known to those skilled in the art. Thus, broadly stated, after sufficient concentrated brine has been accumulated, it may be treated by evaporation for the subsequent recovery of salts therefrom or directly by carbonation for the production of sodium carbonate and hydrated sodium borate. When the concentrated brine in the first instance is evaporated by heating, a mixture of precipitated salts and hot brine is obtained, wherein the salts are separated from the hot brine and subjected to carbonation for the subsequent recovery of sodium carbonate, potassium sulfate and sodium chloride therefrom. The hot brine is treated by flash cooling it in the subsequent recovery of potassium chloride and hydrated sodium borate.

When the concentrated brine in the second embodiment is directly subjected to carbonation with carbon dioxide, salts are precipitated out comprising bicarbonates and borates of sodium. The solids are selectively hot leached to provide a liquid containing sodium borate which on cooling crystallizes out as hydrated sodium borate. The salt solids remaining are calcined to provide sodium carbonate.

The advantage of the invention resides in the fact that a good part of the heat energy costs employed to produce the desired concentration of brine is saved by utilizing solar evaporation and by using natural underground storge space for storing the concentrated brine until it is ready for further processing.

Figure 7:
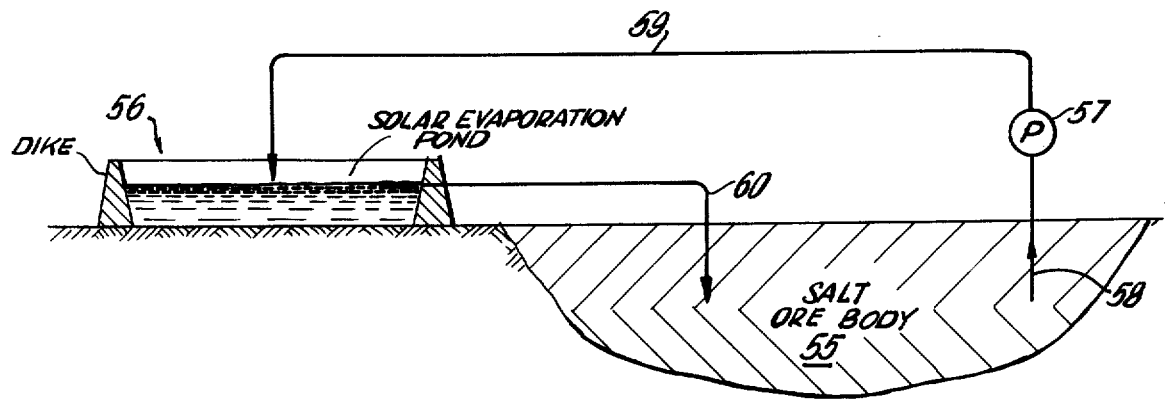
FIGS. 7 to 9 are schematics illustrating additional embodiments of the invention.
Figure 8:
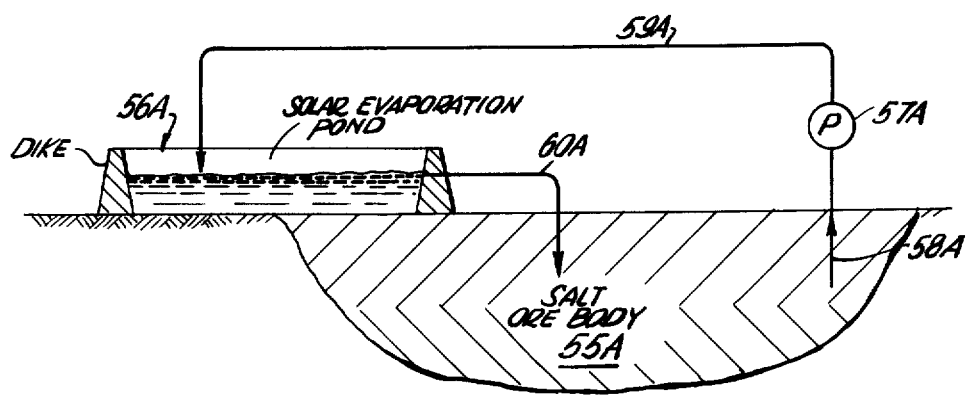
Figure 9:
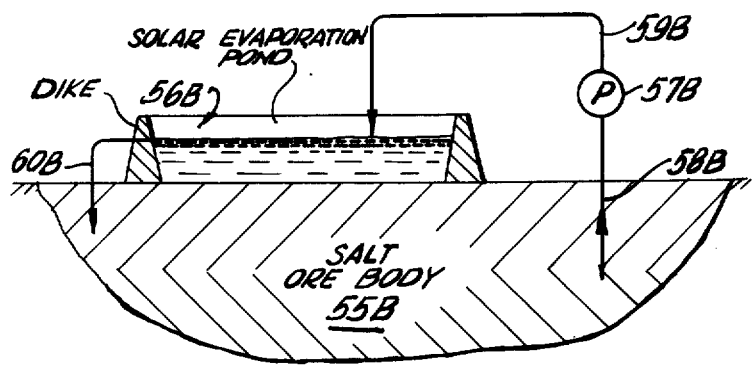

Additional embodiments for carrying out the invention are illustrated schematically in FIGS. 7 to 9.

Referring to FIG. 7, an ore body 55 is shown with a solar evaporation pond 56 located above ground to one side of said ore body. A pump 57 draws the brine from the ore body via line 58 and delivers said brine through line 59 to said pond where it is concentrated by solar evaporation and returned to the ore body as shown by line 60.

In FIG. 8, an ore body 55A is shown with a solar evaporation pond 56A located partially over the salt ore body. A pump 57A draws brine from the ore body via line 58A and delivers said brine through line 59A to pond 56A where it is concentrated by solar evaporation and returned to the ore body as shown by line 60A.

FIG. 9 shows the embodiment in which the pond 56B is located directly above the ore body. A pump 57B draws brine via line 58B from the ore body for delivery to pond 56B through line 59B to pond 56B where it is concentrated by solar evaporation and returned to the ore body as shown by line 60B.

As will be appreciated, the brine may be returned to the ore body in any desired conventional manner, such as by gravity or by force. By recycling the brine during evaporation, the brine may be continually concentrated until the desired concentration is reached to economically optimize the subsequent recovery of chemicals therefrom.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for recovering a plurality of salts selected from the group consisting of carbonates, sulfates, borates and chlorides of sodium and potassium from natural underground Searles Lake brine comprising the steps of, pumping said brine from the natural underground Searles Lake basin to above ground to accumulate a confined body of said brine exposed to solar evaporation in the Searles Lake region, increasing the concentration of said salts of said confined brine by subjecting said brine to solar evaporation, returning the brine of increased concentration to said natural underground basin, continuing pumping brine to above ground, subjecting it to solar evaporation to effect crystallization of concentrated salts and returning said brine to said natural underground basin until a brine of predetermined concentration has been obtained, and thereafter recovering salts from said brine of predetermined concentration.

2. The process of claim 1, wherein after a brine of predetermined concentration has been obtained, the brine is further evaporated by heating to provide a mixture of precipitated salts and hot brine; wherein the salts are separated from the hot brine and the salts subjected to carbonation for the subsequent recovery of sodium carbonate, potassium sulfate and sodium chloride therefrom; and wherein the hot brine is treated by flash cooling in the subsequent recovery of potassium chloride and hydrated sodium borate therefrom.

3. The process of claim 1, wherein said concentrated brine is subjected to carbonation with carbon dioxide to precipitate solids therefrom comprising bicarbonates and borates of sodium, wherein said solids are selectively hot leached to provide a liquid containing sodium borate which is cooled to crystallize out hydrated sodium borate therefrom and wherein the solids remaining are calcined to provide sodium carbonate.

* * * * *